April 10, 1962

A. E. GRAY 3,029,027

APPARATUS FOR COATING PIPE SURFACES

Filed Aug. 12, 1957

INVENTOR
ARTHUR E. GRAY

BY Cushman, Darby & Cushman
ATTORNEYS

INVENTOR
ARTHUR E. GRAY

United States Patent Office 3,029,027
Patented Apr. 10, 1962

3,029,027
APPARATUS FOR COATING PIPE SURFACES
Arthur E. Gray, Pittsburgh, Pa., assignor, by mesne assignments, to Pittsburgh Chemical Company, Pittsburgh, Pa., a corporation of Pennsylvania
Filed Aug. 12, 1957, Ser. No. 677,468
10 Claims. (Cl. 239—215)

This invention relates to the coating of pipe interiors and more particularly to an improved apparatus for mixing and applying two separate materials, preferably of the type which will react with each other, to pipe interiors and the like.

While the invention is suceptible of general utility, in its more specific aspects it embodies an apparatus for mixing together two materials, one, a bitumen and an epoxy resin mixture and, another, a curing agent for the resin and subsequently distributing the mixed materials by centrifugal force uniformly to a pipe material. In dealing with such materials, it is essential to provide an apparatus which will effect a thorough mixing of the two materials before the same are applied. Moreover, after the materials have been thoroughly mixed, it is also essential that they be efficiently applied to the pipe interior so as to preclude the formation of voids and other defects in the coating.

Accordingly, it is an object of the present invention to provide an apparatus of the type described having improved means for effecting an intimate intermixing of two separate materials which will react with each other.

Still another object of the present invention is the provision of an apparatus of the type described having a mixing chamber for receiving separate materials under pressure, one of which is heavier than the other and imparting a centrifugal force to the materials within the mixing chamber so as to advantageously utilize the difference in weights between the two materials in effecting an intermixing of the two.

Still another object of the present invention is the provision of an apparatus of the type described having improved blade means for effecting an intimate intermixing of the two materials.

Still another object of the present invention is the provision of an apparatus of the type described having improved means for distributing a material to a pipe interior by centrifugal force.

A still further object of the present invention is the provision of an apparatus of the type described embodying a rotary material distributor and improved means for feeding the material to the distributor so as to effect an even uniform covering on a pipe interior.

These and other objects of the present invention will become more apparent during the course of the following detailed description and appended claims.

The invention may best be understood with reference to the accompanying drawings wherein illustrative embodiments are shown.

Figure 1:
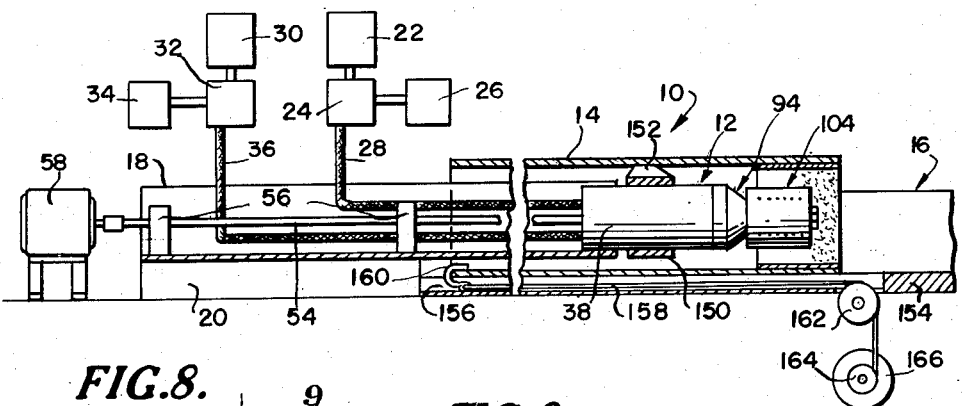
FIGURE 1 is a somewhat schematic vertical sectional view of an apparatus embodying the principles of the present invention.

Referring now more particularly to FIGURE 1 of the drawings, there is shown an apparatus, generally indicated at 10, embodying the principles of the present invention. In general, the apparatus includes an applicator head, generally indicated at 12, arranged to apply a coating of material to the interior a pipe 14. Means, generally indicated at 16, is provided for supporting the pipe 14 in operative position relative to the applicator head 12 and for effecting relative longitudinal movement between the pipe and the applicator head during the operation of the latter so that the material distributed by the head will be received on the pipe as an even coating throughout the interior thereof. The means 16, schematically illustrated in the drawings, is operable to effect a longitudinal movement of the pipe 14 relative to the stationarily mounted applicator head 12 and it will be understood that this arrangement is merely exemplary and that other means may be provided for this purpose. Moreover, it is within the contemplation of the present invention to make the applicator head 12 movable along a stationarily mounted pipe so as to effect distribution of the material to the interior thereof. In this regard, it will be noted that the pipe in the present arrangement is moved with a pure longitudinal movement by the means 16. However, the means may be arranged so that a rotation of the pipe about its own axis relative to the applicator head can also be imparted to the pipe, as well as the longitudinal movement.

In the apparatus illustrated in FIGURE 1, the applicator head 12 is stationarily mounted in cantilever fashion on one end of an elongated, generally U-shaped frame member 18. The other end of the frame member 18 is rigidly secured to a suitable base or the like 20. The applicator head is arranged to receive two separate materials, one of which preferably comprises a bitumen and epoxy resin mixture and the other of which comprises a curing agent for the resin. As shown in FIGURE 1, the bitumen and epoxy resin mixture may be contained in a hopper 22 having a pump 24, driven by a suitable motor 26, connected to the discharge end of the hopper and arranged to feed the bitumen and epoxy resin mixture under pressure through a conduit 28 to the applicator head 12. The curing agent is preferably contained within a hopper 30 having a pump 32, driven by suitable motor 34, connected to the discharge end thereof and arranged to deliver the curing agent to the applicator head through a conduit 36. As shown in FIGURE 1, the conduits 28 and 36 may be suitably mounted within the U-shaped frame member 18.

Figure 2:
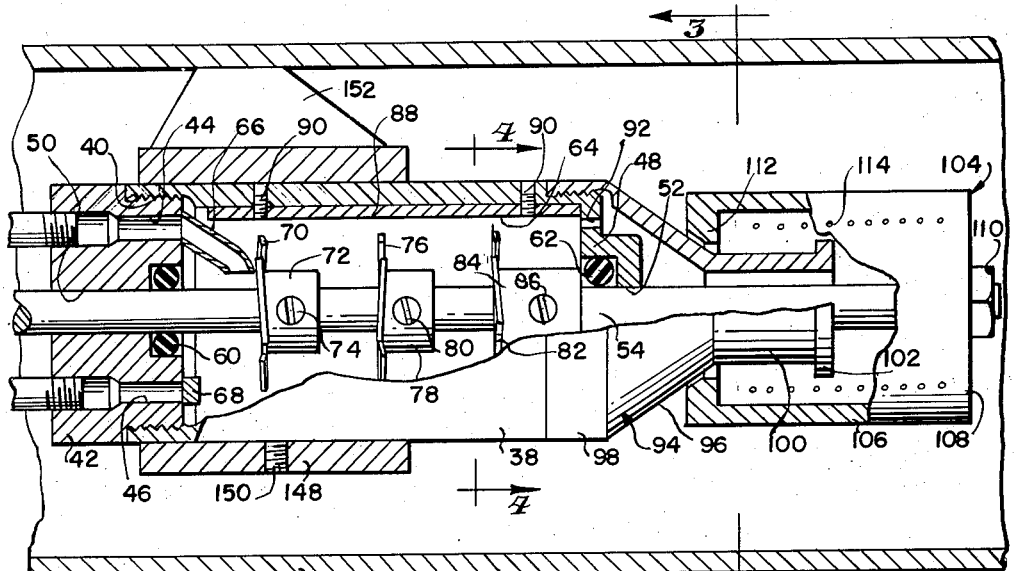
FIGURE 2 is an enlarged fragmentary side elevational view, partly in section, illustrating the applicator head of the present apparatus.

Referring now more particularly to FIGURE 2, the applicator head 12 includes a cylindrical body 38 having its rear end counterbored and threaded, as indicated at 40, so as to threadedly receive a rear end wall 42. The end wall 42 is provided with a pair of longitudinally extended spaced passageways 44 and 46 arranged to be connected with the ends of the conduits 28 and 36 respectively. The opposite end of the cylindrical body 38 of the applicator head is closed by a forward end wall 48. The rear end wall 42 is centrally apertured, as at 50, and the end wall 48 is likewise centrally apertured, as indicated at 52, so as to receive a shaft 54 which extends axially through the applicator head. As best shown in FIGURE 1, the shaft 54 extends rearwardly within the U-shaped frame member 18 and its rearward end is journaled by any suitable means, such as bearing blocks 56, and connected with a motor 58 to be driven thereby.

The forward end of the shaft extends into and is journaled within the applicator head by any suitable means. As shown in FIGURE 2, the end walls 42 and 48 are preferably recessed to receive ball bearing assemblies 60 and 62 respectively, to accomplish this purpose, which engage and serve to journal the shaft 54 within the applicator head although, it will be understood that other journal means, such as sleeve bearings or the like, may be employed, if desired.

The interior of the cylindrical body 38 between the end walls 42 and 48 defines an elongated cylindrical mixing chamber 64 within which the materials introduced therein through the passageways 44 and 46 are intimately intermixed. To effect this mixing of the two materials, the passageway 44 for the bitumen and epoxy resin mixture has a short tube 66 connected therewith which is arranged to direct the material passing through the passageway 44 into the mixing chamber 64 in an area adjacent the shaft 54 or axially within the mixing chamber. The outlet of the passageway 46 has a deflector block 68 connected therewith which is arranged to direct the curing agent issuing therefrom outwardly toward the periphery of the mixing chamber.

Mounted on the shaft 54 within the mixing chamber 64 adjacent the rear end wall 42 is a rear mixing blade assembly 70, which preferably may comprise a disk of metal having blades struck therefrom and bent so as to impart not only a rotary motion to the materials within the mixing chamber, but a forward longitudinal motion as well. The blade assembly 70 is secured to the shaft by any suitable means, such as a rigid central hub 72 having a set screw 74 threaded therein for engagement with the shaft. Mounted in spaced relation on the shaft 54 forward of the rear mixing blade assembly 70 is an intermediate mixing blade assembly 76 of substantially similar construction and including a rigid hub 78 having a set screw 80 threaded therein for securing the blade assembly to the shaft. The blade assembly 76 preferably has blades struck from a disk of metal and bent in an opposite direction from those of the blade assemblies 70 so that in operation, the material is given not only a rotary motion, but a rearward longitudinal motion as well. Disposed within the mixing chamber 64 adjacent the forward end wall 48 thereof is a forward blade assembly 82, which preferably is identical with the blade assembly 70 and includes a rigid hub 84 having a set screw 86 threaded therein for engaging the shaft 54. Like the rear blade assembly 70, the forward blade assembly 82 is arranged to impart a rotary motion and a forward longitudinal motion to the material within the mixing chamber. To further aid in agitating the materials within the mixing chamber 64, there is provided a plurality of circumferentially spaced, longitudinally extending baffles 88 suitably secured to the cylindrical body by any suitable means, such as set screw 90 or the like.

In order to discharge the material from the mixing chamber, the forward end wall 48 is provided with a plurality of circumferentially spaced discharge orifices or apertures 92 through which the material discharges into a nozzle 94. The nozzle 94 includes a frusto-conical intermediate portion 96 having a longitudinally extending cylindrical flange 98 extending from the rear end thereof, which is interiorly threaded to engage exterior threads formed on the forward end of the cylindrical body 38. Extending from the forward end of the frusto-conical portion 96 is a cylindrical portion 100 having an outwardly extending radial flange 102 formed on the forward end thereof.

Figure 5:
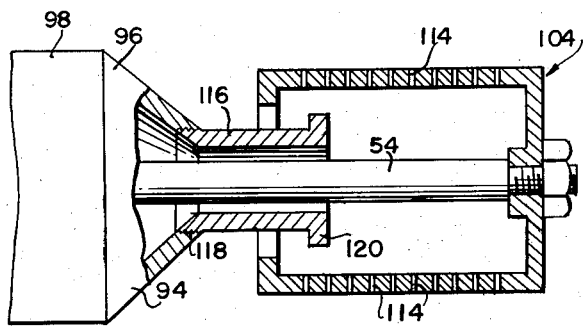
FIGURE 5 is a fragmentary side elevational view, partly in section, illustrating a modification of the discharge nozzle of the applicator head.
Figure 4:
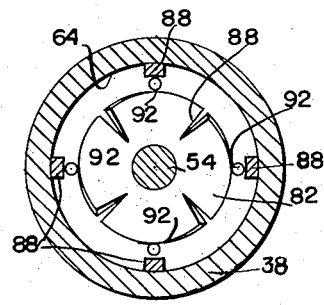
FIGURE 4 is a cross-sectional view taken along the line 4—4 of FIGURE 2.

The shaft 54 extends through the mixing chamber 64 and outwardly through the cylindrical portion 100 of the nozzle 94 and has its outer end arranged to receive a rotary distributor 104. The rotary distributor 104 includes a hollow cylindrical member 106 having the forward end thereof provided with a centrally apertured end wall 108 arranged to receive the outwardly extending end of the shaft 54 and to be rigidly secured thereto by any suitable means, such as a nut 110 threaded on the end of the shaft. The opposite end of the cylindrical member 106 extends over the cylindrical portion 100 of the nozzle and has an inwardly directed radial flange 112 formed thereon which is disposed in spaced relation to the nozzle. Extending through the hollow cylindrical member 106 is a plurality of circumferentially spaced narrow apertures 114. As best shown in FIGURES 2 and 5, for a two inch diameter cylindrical member 106 the apertures are preferably arranged in six rows around the circumference of the member 106 and each row preferably contains appoximately 15 apertures. It will be understood that the number of rows provided will increase with an increase in the diameter of the member 106.

Referring now more particularly to FIGURE 5 in the drawings, there is shown a slight modification of the nozzle 94 in which a separate cylindrical nozzle outlet 116 is provided. The inner end of the cylindrical outlet portion 116 may be suitably threaded, as at 118, to engage cooperating threads formed in the frusto-conical portion of the nozzle 94. The cylindrical outlet portion 116 includes an outwardly extending radial flange 120 which is disposed near the rear end of the rotary distributor 104.

Figure 6:
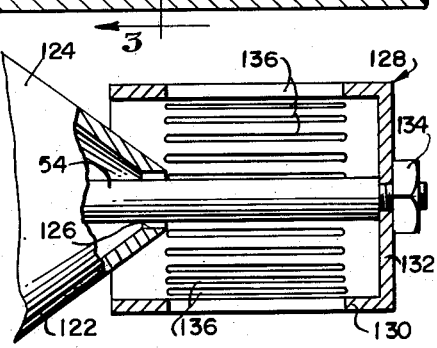
FIGURE 6 is a view similar to FIGURE 5 illustrating still another modification of the nozzle of the applicator head and a modified form of the rotary distributor.

In FIGURE 6, there is shown a modified nozzle 122 which includes a frusto-conical portion 124 terminating in an outlet 126. A modified rotary distributor 128 is secured to the shaft 54 extending outwardly through the outlet 126 and includes a hollow cylindrical member 130 having a centrally apertured forward end wall 132 arranged to receive the end of the shaft 54 and to be fixedly secured thereto by any suitable means, such as a nut 134. The cylindrical member is open at its opposite end and has a series of circumferentially spaced longitudinally extending elongated slots 136 formed therein through which the material is discharged by centrifugal force.

Figure 7:
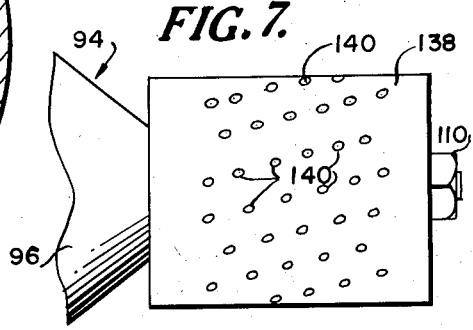
FIGURE 7 is a fragmentary side elevational view of still another modified form of the rotary distributor.

FIGURE 7 illustrates a further modified form of a rotary distributor 138 which is similar to the distributor 104 but includes a series of circumferentially spaced apertures 140 arranged in spaced spiral rows about the circumference of the hollow cylindrical member.

Figure 8:
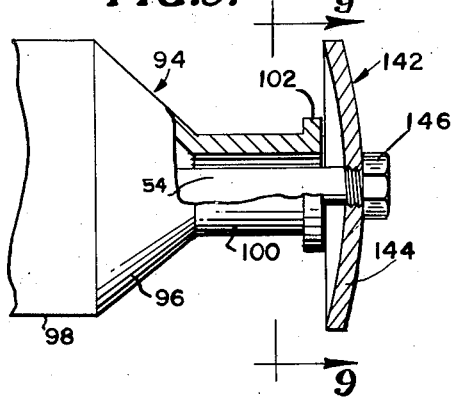
FIGURE 8 is a view similar to FIGURE 6 illustrating still another modified form of the rotary distributor.
Figure 9:
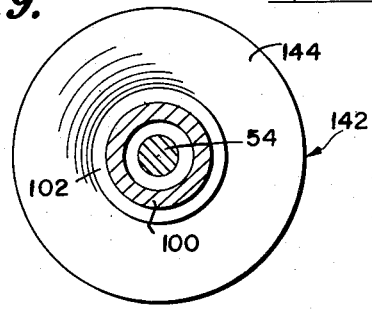
FIGURE 9 is a cross-sectional view taken along the line 9—9 of FIGURE 8.

FIGURES 8 and 9 illustrate a further modified form of distributor 142, which comprises a concavo-convex disk 144 having a central aperture formed therein for receiving the end of the shaft 54 and to be fixedly secured thereto, as by a nut 146. The disk 144 has its concave surface facing the discharge outlet of the nozzle and is arranged to receive the material issuing therefrom and to distribute the same into the interior of the pipe by centrifugal force.

Figure 3:
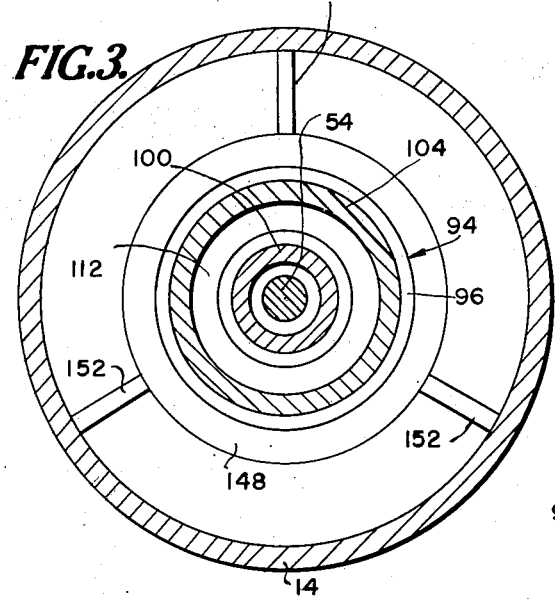
FIGURE 3 is a cross-sectional view taken along the line 3—3 of FIGURE 2.

In order to facilitate relative longitudinal movement between the pipe 14 and the applicator head 12, the latter is provided with a ring 148 which is arranged to engage the exterior surface of the cylindrical body 38 and to be fixed thereto, as by a set screw 150, in different positions of adjustment. Extending outwardly from the ring 148 are a series of circumferentially spaced guide fins 152 arranged to engage the interior surface of the pipe 14 and to maintain the applicator head in concentric relation therewith. As shown in FIGURE 3, three guide fins 152 are provided and it will be understood that more or less than three may be utilized, if desired.

The means 16 illustrated in FIGURE 1 for effecting relative movement between the pipe 14 and applicator head includes a U-shaped saddle or guide member 154 which is arranged to receive the pipe and to support the same for longitudinal movement. The saddle 154 includes a central elongated slot 156 within which a cable 158 may extend. The cable 158 has a hook 160 on one end thereof for engaging one end of the pipe and the opposite end thereof is trained about a pulley 162 and a winch 164 powered by a suitable motor 166 or the like.

Operation

In the operation of the apparatus 10 illustrated in FIGURE 1, the pipe to be lined is moved within the saddle 154 over the applicator head 12 with the hook 160 connected with the rear end thereof and the cable 158 extended from the winch 164 and then motors 26, 34, 58 and 166 are started to commence operation. It will be noted that pumps 24 and 32 driven by the motors 26 and 34 respectively are operable to introduce the bitumen and epoxy resin mixture from the hopper 22 and the curing agent from the hopper 30 through the conduits 28 and 36 respectively into the mixing chamber 64 under pressure. The bitumen and epoxy resin mixture is somewhat heavier than the curing agent and, hence, directed axially into the chamber by means of the tube 66. The curing agent is directed to the periphery of the mixing chamber by the deflector block 68. Thus, the supply of the heavier material is toward the center of the chamber, while the supply of the lighter material is around the periphery thereof. The blades of the blade assemblies 70, 76 and 82 set the material within the mixing chamber into rotary motion and such rotary motion effects an intermixing of the two materials as a result of centrifugal force. That is, since the heavier material tends to move toward the periphery as a result of the centrifugal action, it will become intermixed with the lighter material supplied therein. In addition to the rotary motion imparted by the blade assemblies, it will be noted that the rear blade assembly serves to impart a forward longitudinal movement to the material within the mixing chamber as well. The intermediate blade asembly 76 has the opposite effect and serves to move the two materials in a rearward longitudinal direction so that there is additional agitation and mixture due to this arrangement. Finally, the forward blade assembly 82 is arranged to impart a forward longitudinal movement to the material, which is opposed to the longitudinal movement of the intermediate blade so that still more agitation and intermixing of the materials is obtained in this manner. As noted above, all three of the blade assemblies serve to impart a rotary movement to the material within the mixing chamber and the provision of the baffles 88 serves to agitate the materials in rotary motion so that they are not separated as a result of centrifugal action, but are continuously agitated. Finally, the movement of the materials outwardly through the restricted orifices 92 achieves a still further intermixing as a result of the baffling effect of portion of the walls defining the orifices. The total effect of these four distinct intermixing actions, that is, (1) the movement of the heavier material into the lighter material as a result of centrifugal action, (2) the agitation caused by the longitudinal movements imparted in opposite directions by the blade assemblies, (3) the agitation of the rotating mass caused by the baffles 88 and (4) the agitation of the mass caused by its passages through the orifices 92, serves to intimately intermix the two materials supplied within the mixing chamber.

Since the materials are supplied within the mixing chamber 64 under pressure by the operation of the pumps 24 and 32, they will be discharged therefrom under such pressure, after being thoroughly mixed, as indicated above, through the outlet apertures 92 within the forward end wall 48. The mixed materials then enter within the frusto-conical portion of the nozzle and issue outwardly into the rotary distributor 104 through the cylindrical nozzle portion 100 around the shaft 54. The material within the rotary distributor 104 discharges through the apertures 114 and the hollow cylindrical member 106 due to the centrifugal force created as a result of the rotary motion of the distributor.

In this manner, the two materials are first intimately intermixed and then subsequently distributed to the interior of the pipe 14. It will be understood that the pipe 14 is moved at a uniform rate of speed during the operation of the applicator head so that a coating of uniform thickness is applied to the interior thereof as the mixed materials discharge through the apertures in the distributor 104. The arrangement of apertures illustrated in the distributor 104 shown in FIGURES 1–4 is preferable and the provision of the flange 112 serves to prevent spillage or leakage of the material axially outwardly from the hollow cylindrical member 106. The distributor 128 illustrated in FIGURE 6 achieves satisfactory results and does not require the utilization of the inwardly directed flange. The distributor 138 of FIGURE 7 operates quite similar to the distributor 104 and is preferable for some applications. The concavo-convex disk 144 of FIGURE 8 is particularly advantageous due to its simplicity of construction. This distributor merely receives the material issuing from the nozzle outlet and moves the same outwardly by centrifugal action.

In general, the mixed materials must have sufficient viscosity to adhere to the pipe interior without running. However, the less viscous the mixed materials are, the more readily they can be handled to completely cover the pipe interior uniformly throughout. It is also desirable to operate the applicator head at a medium to high r.p.m. Furthermore, it is preferable to operate the pump at a relatively low rate and with a low speed movement between the applicator head and pipe so as to apply a relatively thick coating to the interior of the pipe of the order of 15 mils or more. With such an application, an uninterrupted coating of uniform thickness is applied to the pipe.

In order to reduce the viscosity of the epoxy resin-bitumen composition, there can be added a solvent, or thinner, such as an aromatic hydrocarbon, or mixtures of aromatic hydrocarbons, e.g., toluene, xylene, or solvent naphthas, for example. The epoxy ethers or resins suitable for use in the compositions of the invention contain along with ethereal oxygen, glycidyl groups in such quantity that the material has a 1,2-epoxy equivalency in the average molecule of greater than one. By the epoxy equivalency, reference is made to the average number of 1,2-epoxy groups

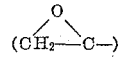

contained in the average molecule of the ether.

A preferred group of epoxy ethers for use in the invention is prepared by reacting a dihydric phenol with epichlorhydrin in alkaline solution. These products are of resinous character and in general are solid materials at normal temperature (20–30° C.). Any of the various dihydric phenols are used in preparing these glycidyl ethers, including mononuclear phenols like resorcinol, catechol, hydroquinone, etc., or polynuclear phenols like bis-(4-hydroxyphenyl)-2,2-propane (bis-phenol), 4,4'-dihydroxy benzophenone, bis-(4-hydroxyphenyl)-1,1-ethane, bis-(4-hydroxyphenyl)-1,1-isobutane, bis-(4-hydroxy-phenyl)-2,2-butane, bis-(4-hydroxy-2-methylphenyl)-2,2-propane, bis-(hydroxy-2-tertiary butyl phenyl)-2,2-propane, bis-(2-dihydroxynaphthyl)-methane, 1,5 - dihydroxy naphthalene, etc. The product may be represented by the formula:

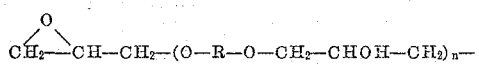

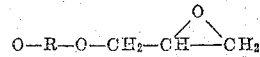

wherein $n$ is an integer, preferably from 1 to 7, and R represents the divalent hydrocarbon radical of the dihydric phenol. The preferred epoxy ethers for use in the invention are those having epoxy values no less than 0.20 (Pyridinium Chloride Method), and melting points no greater than 80° C. (Durran's Mercury Method). The preferred phenol is bis-phenol A.

Less preferably, there can be used 1,2-epoxy-containing polyethers of polyhydric alcohols, such as polyglycidyl ethers thereof, like the diglycidyl ether of ethylene glycol, propylene glycol, trimethylene glycol, diethylene glycol, triethylene glycol, glycerol, dipropylene glycol and the like. Other typical ethers of this class include glycidyl ethers of polyhydric alcohols having a 1,2-epoxy equivalency greater than one, such as the polyglycidyl ethers of glycol, diglycerol, erythritol, pentaglycerol, mannitol, sorbitol polyallyl alcohol, polyvinyl alchol, and the like.

In general, the glycidy ether resin will have an epoxy equivalency greater than 1 and usually less than 2. The epoxy equivalency may be defined as the number of epoxy groups per molecule in contrast to the epoxy value which is the number of epoxy groups in 100 grams of the resin.

While the epoxy resin can be utilized by itself, it has been found preferable to employ a mixture of the epoxy resin and a bituminous material, such as coal tar pitch. The pitch can be present, if desired, as coal tar or a liquid organic vehicle, such as aromatic high flash naphtha creosote oil, ketones, chlorinated solvents, toluene or xylene, can be added to the pitch. Generally, 10 to 90 parts of epoxy resin and 90 to 10 parts of pitch based on 100 parts by weight of the total epoxy resin-pitch content are employed. In addition to the coal tar pitch and epoxy resin, there can also be added finely divided fillers, e.g., silica, talc, clay, slate flour, diatomaceous earth, mica, etc., as well as solvents, as set forth previously. The epoxy resin-bituminous composition is introduced through conduit 28 to the applicator head 12.

The curing agent can be a polyfunctional amine, such as ethylene diamine, diethylene triamine, benzyl dimethylamine, ethylene triamine, 3-dimethylaminopropylamine, 3-diethylaminopropylamine, tetraethylene pentamine, triethylene tetramine and the like. Additional curing agents include N-hydroxyethyl diethylenetriamine, tri-(dimethylaminomethyl) phenol, m-phenylene diamine, dicyandiamide, melamine, piperazine, diacetone diamine, 4,4'-diaminodiphenyl sulfone, sodium hydroxide, potassium hydroxide, sodium phenoxide, acid materials preferably having a plurality of acid groups, e.g., oxalic acid, phthalic anhydride, citric acid, tricarbyllic acid, aconitic acid, itaconic acid, malic acid, diglycollic acid, phosphoric acid, n-butyl dihydrogen phosphate, diethyl ortho phosphate, hexaethyl tetraphosphate, Friedel-Crafts metal halides, e.g., aluminum chloride, zinc chloride, ferric chloride, boron trifluoride, boron-fluoride-diethyl ether complex, boron-fluoride-phenol complex, diisocyanates, (e.g., 2,4-toluene diisocyanate) and polyamides, e.g., long chain fatty acid amides, such as Versamid 115 and Versamid 125. The curing agent is introduced through conduit 36 to the applicator head 12.

The curing agents may be used in various amounts, although they are usually employed in the range of from 0.05 to 0.25 part per part by weight of epoxy resin. While the bituminous material is normally added together with the epoxy resin through conduit 28, it is possible to add the bituminous material with the curing agent through conduit 36. The resin and curing agent, however, should always be added through separate lines to the applicator head.

While, as previously stated, the ratio of epoxy resin to bituminous material, e.g., coal tar pitch, can be widely varied, usually from 15 to 50 parts of resin and from 85 to 50 parts of pitch based on 100 parts of epoxy resin-pitch content are employed.

Frequently, it is desirable to add a minor amount of chlorinated rubber (Parlon) or rubber hydrochloride to the composition. Generally, the chlorinated rubber or rubber hydrochloride is used in an amount of 0.1 to 5% of the total composition by weight.

Thixotropic agents, e.g., labosil (a colloidal silica formed in a high temperature vapor phase flame hydrolysis process which produces an extremely fine product with a particle diameter of about 15 millimicrons; chemically it is practically a pure silica with an average $SiO_2$ content of 99 to 99.7%) and quaternary ammonium clays, e.g. Bentone 34 (dimethyl dioctadecyl ammonium bentonite) can also be added in an amount of 1 to 5% of the total composition.

Unless otherwise stated, all parts are by weight. In a specific example using the apparatus of FIGURE 2, through conduit 28 there was pumped component A, a mixture of 30 parts of an epoxy ether resin from bisphenol A and epichlorhydrin (melting point 9° C. and epoxy value 0.50), 0.6 part Parlon 29.4 parts of coal tar pitch 20.0 parts of aromatic high flash naptha, 9 parts mica, 10 parts of talc and 1 part of cabosil. Simultaneously, through conduit 36, there were pumped component B, a mixture of 5 parts of diethylene triamine dissolved in 5 parts of mixed xylenes. Thus, the material was pumped through conduit 28 in an amount 10 times as much as that pumped through conduit 36. The drive shaft 54 was rotated at a speed of 4350 r.p.m. Utilizing these conditions, blemish-free coverage of a 3" diameter pipe was obtained by moving the pipe at a rate to obtain an 18 mils coverage.

In another example where component A was diluted with 12.5% by volume of xylene but the ratio of feed of component A to component B was maintained at 10 to 1, blemish-free coverage of the 3" diameter pipe was obtained when the shaft was rotated at a speed of 2333 r.p.m. and the pipe was moved at a rate to give a coverage of 16 mils thickness.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In an apparatus of the type described, the combination comprising an applicator head defining an elongated mixing chamber, first means communicating with one end of said chamber for directing a first material under pressure therein, second means communicating with said one chamber end separate from said first means for separately directing a second material under pressure into said chamber, rotary shaft means extending longitudinally through said mixing chamber, blade means fixed on said shaft means for mixing the separate materials entering said mixing chamber, a nozzle communicating with the opposite end of said mixing chamber through which the mixed materials are discharged from the mixing chamber, said shaft means extending through said nozzle, and a rotary distributor secured to said shaft means outwardly of said nozzle for receiving the mixed materials issuing from said nozzle and distributing the same by centrifugal force.

2. The combination as defined in claim 1 wherein said distributor comprises a cylindrical member having an end wall on one end thereof secured to said shaft means, the opposite end of said cylindrical member being disposed in surrounding relation to said nozzle, said cylindrical member having circumferentially spaced aperture means formed therein.

3. The combination as defined in claim 1 wherein said distributor comprises a concavo-convex disk concentric with said shaft means and having its concave side arranged to receive the material from said nozzle.

4. In an apparatus of the type described, the combination comprising an applicator head defining an elongated cylindrical mixing chamber for receiving separate materials one of which is heavier than the other, means adjacent one end of said chamber for directing the heavier material into said chamber adjacent its axis, means adjacent said one chamber end for directing the other material into said chamber adjacent its periphery, an axial shaft rotatable within said chamber, spaced blade means on said shaft operable to impart a rotary motion to the materials within said chamber so as to cause an intermixing of the materials as a result of the centrifugal action of the heavier material with respect to the other material and to impart axial movements to the materials in opposite directions so as to effect further intermixing, longitudinally extending baffle means on the interior periphery of said mixing chamber operable to impart turbulence to the materials within said chamber passing thereby with a rotary motion so as to effect still further intermixing, and means adjacent the other end of said chamber through which the intermixed materials within said chamber are discharged.

5. In an apparatus of the type described, the combination comprising an applicator head having a chamber provided with a nozzle at one end thereof through which a mixture contained within said chamber is discharged, a rotary shaft extending through said chamber and said nozzle, a rotary distributor fixed to said shaft outwardly of said nozzle for receiving the mixture discharging from said nozzle and distributing the same by centrifugal force, said distributor comprising a hollow cylindrical member concentric with said shaft having one end thereof disposed in surrounding relation relation to the discharge end of said nozzle and the opposite end thereof provided with an impervious end wall secured to said shaft in spaced relation to the discharge end of said nozzle, said cylindrical member haivng narrow aperture means formed therein through which the mixture is distributed by centrifugal force.

6. The combination as defined in claim 5 wherein the one end of said cylindrical member includes an inwardly extending radial flange.

7. The combination as defined in claim 5 wherein said nozzle includes a frusto-conical portion having its large end communicating with said chamber and a cylindrical outlet portion secured to the other end thereof.

8. The combination as defined in claim 7 wherein said cylindrical portion includes an outwardly extending radial flange.

9. In an apparatus of the type described, the combination comprising an applicator head defining an elongated mixing chamber, first pump means for introducing a first material under pressure into said chamber, second pump means for introducing a second material under pressure into said chamber, rotary shaft means extending longitudinally through said mixing chamber, means for rotating said shaft means, blade means fixed to said shaft means within said chamber for mixing the materials introduced into said chamber, a nozzle communicating with said mixing chamber through which the mixed materials therein are discharged, said shaft means extending through said nozzle, and a rotary distributor fixed to said shaft means outwardly of said nozzle for receiving the mixed materials discharging from said nozzle and distributing the same by centrifugal force.

10. The combination as defined in claim 4 wherein said last mentioned means includes restricted discharge orifices operable to effect a final intermixing as the materials pass therethrough.

References Cited in the file of this patent

UNITED STATES PATENTS

| | | |
|---|---|---|
| 1,363,368 | Sonsthagen | Dec. 28, 1920 |
| 2,353,368 | Schulz | July 11, 1944 |
| 2,363,776 | Dale | Nov. 28, 1944 |
| 2,417,929 | Hanson | Mar. 25, 1947 |
| 2,501,779 | Loudenback et al. | Mar. 28, 1950 |
| 2,575,353 | MacEvoy | Nov. 20, 1951 |
| 2,602,002 | Schutt | July 1, 1952 |
| 2,627,438 | McNair | Feb. 3, 1953 |
| 2,730,463 | Phillips | Jan. 10, 1956 |
| 2,734,832 | Lewis | Feb. 14, 1956 |
| 2,765,288 | Whittier et al. | Oct. 2, 1956 |
| 2,768,405 | Mineah | Oct. 30, 1956 |
| 2,814,827 | Snow et al. | Dec. 3, 1957 |